March 8, 1966 P. J. PRICE 3,239,688
LOGICAL DEVICES
Filed Dec. 31, 1962
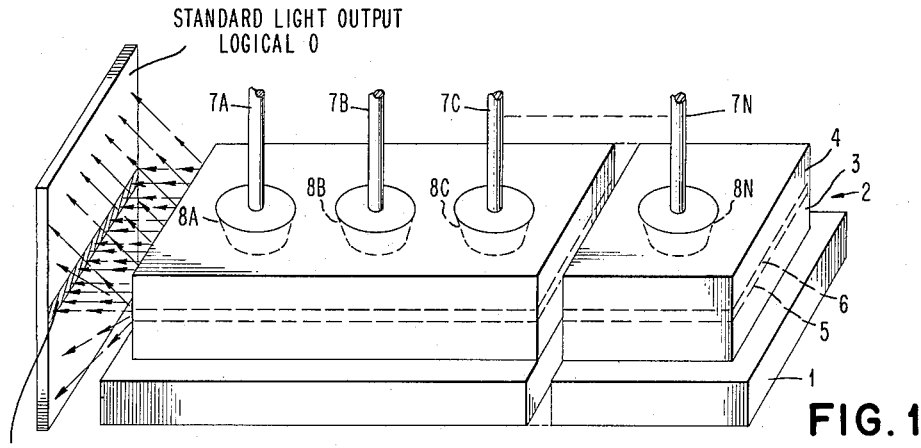
FIG. 1
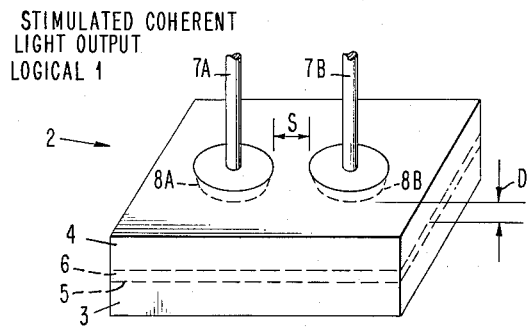
FIG. 1A
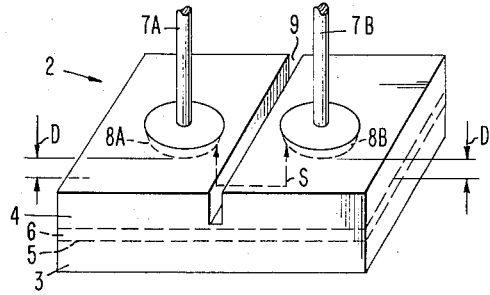
FIG. 1B
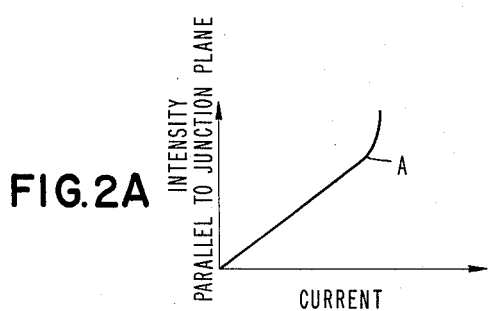
FIG. 2A
FIG. 2B
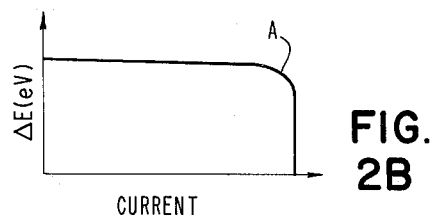
FIG. 3
INVENTOR
PETER J. PRICE
BY *Alvin J. Riddles*
ATTORNEY

United States Patent Office 3,239,688
Patented Mar. 8, 1966

3,239,688
LOGICAL DEVICES
Peter J. Price, New York, N.Y., assignor to International Business Machines Corporation, New York, N.Y., a corporation of New York
Filed Dec. 31, 1962, Ser. No. 248,521
10 Claims. (Cl. 307—88.5)

This invention relates to logical devices; and, in particular to devices for performing logic involving the phenomenon of stimulated emission of radiation in solid state devices.

Stimulated emission of radiation in solid state devices has been characterized by an abrupt narrowing of the emission line width of light from a region in the vicinity of a "p-n" junction and by a sharp increase in light intensity in the direction of the junction plane, in certain semiconductor materials at a particular injected current value. Efforts thus for in the art to utilize these devices have been primarily directed to the modulation of either the injected current or the light output.

In accordance with the invention, logical information can be inter-related within the structure of one of these devices by structurally providing a plurality of sources for the current introduced and arranging these sources within a body so that the light output is responsive to the sum of the injected currents. This is accomplished, in accordance with the invention, by providing a plurality of injecting contacts in functional, operational relationship to a common stimulated emission active region within a semiconductor device capable of exhibiting stimulated emission of radiation and inter-relating the plurality of contacts so that the effective cross impedance between each contact is sufficiently large relative to the impedance between the contact and the common stimulated emission active region within the device.

A number of the physical principles on which devices exhibiting stimulated emission of radiation operate are set forth in the following references, which are provided in order to provide background for one skilled in the art in the practice of this invention.

"Recombination Radiation of Gallium Arsenide" by D. N. Nasledov, A. A. Rogachev, S. M. Ryvkin, and B. V. Tsarenkov, in Soviet Physics-Solid State, published by American Institute of Physics, vol. 4, No. 4, October 1962; pp. 782–784.

"Recombination Radiation Emitted by Gallium Arsenide" by R. J. Keyes and T. M. Quist in Proceedings of the IRE, vol. 50, No. 8, August 1962, pp. 1822–1823.

"Coherent Light Emission from GaAs Junctions" by R. N. Hall, G. E. Fenner, J. D. Kingsley, T. J. Soltys, and R. O. Carlson in Physical Review Letters, vol. 9, No. 9, November 1, 1962, pp. 366–368.

"Infrared and Optical Masers" by A. L. Schawlow and C. H. Townes in Physical Review, vol. 112, No. 6, December 15, 1958, pp. 1940–1949.

"Injection Luminesence from Gallium Arsenide" by J. I. Pankove and M. J. Massoulié in Bulletin of the American Physical Society, vol. 7, January 1962, p. 88.

"Semiconductor Maser of GaAs" by T. M. Quist, R. J. Keyes, W. E. Krag, B. Lax, A. L. McWhorter, R. H. Rediker and H. J. Zeiger in Applied Physics Letters, vol. 1, No. 4, December 1, 1962, p. 91.

"Stimulated Emission of Radiation from GaAs p-n Junctions" by M. I. Nathan, W. P. Dumke, G. Burns, F. H. Dill, Jr. and G. Lasher in Applied Physics Letters, vol. 1, No. 3, November 1, 1962, p. 62.

"Recombination Radiation in GaAs by Optical and Electrical Injection" by M. I. Nathan and G. Burns in Applied Physics Letters, vol. 1, No. 4, p. 89, December 1, 1962.

It is an object of this invention to provide a stimulated emission of radiation logical device.

It is another object of this invention to provide a structure capable of providing stimulated emission of radiation in response to a combination of signals therein.

It is another object of this invention to provide a structure capable of providing stimulated emission of radiation in response to the addition of signals therein.

It is another object of this invention to provide a solid state stimulated emission of radiation AND element.

It is another object of this invention to provide a soild state stimulated emission of radiation Majority element.

Is is another object of this invention to provide an operating technique for performing logic based on the combination of currents in a stimulated emission of radiation solid state device.

It is another object of this invention to proivde an operating technique for performing logic based on the addition of currents in a stimulated emission of radiation solid state device.

The foregoing and other objects, features and advantages of the invention will be apparent from the following more particular description of a preferred embodiment of the invention, as illustrated in the accompanying drawings.

In the drawings:

FIG. 1 is an illustration of a stimulated emission of radiation solid state device illustrating the principles of the invention.

FIG. 1A is an illustration of the relative magnitudes of structural dimensions within the solid state device in order to practice the invention.

FIG. 1B is an exemplary alternate method of construction to achieve the dimensional relationship essential in accordance with the invention.

FIG. 2A is a graph illustrating a threshold change in light intensity parallel to the plane of a "p-n" junction.

FIG. 2B is a graph illustrating the abrupt threshold of output light line narrowing at the current density that produces stimulated emission in a solid state device.

FIG. 3 is an example logical truth table illustrating some of the logical properties of the device of the invention.

In accordance with the invention, the stimulated emission light output of a device exhibiting such output by recombination of injected carriers therein can be caused to be responsive to the sum of a plurality of independent signal sources, by providing a separate contact for each signal source, and, an impedance relationship within the device between the individual contacts and the active region in which the stimulated emission of radiation is taking place, such that, the impedance within the device from an individual signal introduction connection to the active region, wherein the stimulated emission of radiation is taking place is sufficiently small relative to the impedance within the device between the individual members of the plurality of signal introducing connections. When these criteria are satisfied, the light output from the device is a function of the sum of the currents in the individual signal sources.

The phenomenon of stimulated emission of radiation in solid state devices has been under intense study and the state of the art is undergoing rapid development. At the present state of the art, stimulated emission of radiation by recombination of injected carriers has taken place in semiconductor materials wherein current, in excess of a particular value, has been injected across a "p-n" junction. While the mechanism, through which the stimulated emission of radiation takes place, has not been fully established, the following facts have been established.

The injection of current across the "p-n" junction produces recombination of carriers in the vicinity of the "p-n" junction. The recombination radiation appears to be confined to the "p" region but does not permeate the entire "p" region of the crystalline device.

Devices which exhibit stimulated emission of radiation due to the recombination of injected carriers have been acquiring a term in the art known as "injection lasers." For purposes of definition, the term "laser active region" will be given to the above described region in the vicinity of the "p-n" junction in the crystal in which the stimulated emission of radiation is taking place.

Referring to FIG. 1, there is shown positioned on a reference element 1, provided for perspective purposes and to serve as a broad area ohmic contact, an example of an injection laser constructed in accordance with the invention wherein independent signal introduction terminals are provided as separate ohmic contacts. The injection laser is made up of a semiconductor crystal 2, for example gallium arsenide, having a region 3 of, for example, "n" conductivity type provided by introducing a conductivity type determining impurity, such as tellurium into the gallium arsenide crystals in a concentration sufficient to produce the "n" conductivity type. The crystal 2 has a region 4 of "p" conductivity type produced by introducing conductivity type determining impurities sufficient to produce the "p" conductivity type. This may be done, for example, by diffusing zinc into the crystal to form the "p" region 4 and the "p-n" junction 5. Since the crystal described as an example here is of the Group III–V intermetallic compound semiconductor materials, the impurities introduced must be of a type to provide either excess positive or negative charge carriers within the crystal, in accordance with the conductivity type desired. In other words, for example, for "n" conductivity type Group VI of the Periodic Table has been found to be satisfactory and for "p" type conductivity, elements of Group II of the Periodic Table have been found to be satisfactory. Since the conductivity type of the particular region of the semiconductor crystal is governed by the predominance of one conductivity type impurity over the other and the resistivity of the crystal is governed by the net quantity of one conductivity type impurity over the other, it will be necessary to introduce the respective conductivity type determining impurities in a concentration sufficient to override any already present particular extrinsic conductivity type determining impurity concentration therein and to establish a net concentration compatible with the desired device characteristics.

When the crystal 2 is exhibiting a light output, current is passed in the forward direction across the "p-n" junction 5 and when this current reaches a threshold value, stimulated emission of radiation occurs within the portion of the crystal 4 in an illustrative region 6 adjacent the junction 5. This region will be referred to as the laser active region and appears, within present observations, not to premeate the entire volume of the region 4 of the crystal.

The light output of the device is shown schematically as coming from one side and impinging on a reference background in order to illustrate the change from a wide band of standard light to an intense narrower band of stimulated emission coherent light, as will be later described.

In accordance with the invention, a plurality of separate signal introduction connections 7A, 7B, 7C . . . 7N are shown, for example, as ohmic contacts penetrating through the crystal portion 4 the laser to active region 6. Each of these contacts may be employed for the introduction of separate logical variable signals in the form of incremental current quantities so that the sum of the variables present may be employed to generate logical operators, in accordance with the principles of logic.

It is essential, in accordance with the invention, that the intercontact signal operating relationship with respect to the laser active region in the device of the invention be controlled. It is necessary that the internal crystal impedance between the effective low impedance region of the contacts 8A, 8B, 8C . . . 8N, shown dotted in FIG. 1, and the laser active region 6 be sufficiently small relative to the cross impedance between the low impedance regions of the individual contacts.

Referring next to FIGS. 1A and 1B, the relationship of these dimensions is illustrated in more detail in terms of physical crystal dimensions wherein, in FIGS. 1A and 1B an exemplary broken away portion of FIG. 1 is shown showing the proximity of two contacts 7A and 7B. The same reference numerals have been employed.

In FIG. 1A, the region of low impedance of the ohmic contacts 8A and 8B is shown to be quite shallow and a separating dimension "D" between the regions of low impedance 8A and 8B and the laser active region 6 is shown. Where the contacts are made by alloying, the dimension "D" may be readily established by alloying to a desired depth. Planarity of the contacts can be established by proper crystallographic orientation of the crystal 2 with respect to the surface into which the contacts are being alloyed. As an illustration, in accordance with the invention, the dimension "D" for each contact to the laser active region is smaller than an individual contact separation dimension "S" illustrated in FIG. 1A as the dimension from contact region 8A to 8B.

Referring next to FIG. 1B, it will be apparent that the impedance criteria of the invention, in terms of dimensional relationship, can be achieved in more than one way. Where the dimensions "D" and "S" from the low resistivity regions of contacts 8A and 8B to the laser active region and to each other are essentially the same; or, the distance "S" is less than "D," a slot 9 may be cut in the region 4 of the crystal so that the dimension "S" is now longer than either of the individual dimensions "D." It will be apparent to one skilled in the art that this intercontact impedance relationship may be achieved in ways beyond those illustrated, for example, by etching and use of crystalline resistivity as a variable parameter. The individual geometry of the contact arrangement employed in the injection laser will frequently govern the most advantageous approach to the establishment of this impedance relationship required in accordance with the invention.

Referring next to FIGS. 2A and 2B, there are shown graphs illustrating a threshold change in light intensity parallel to the "p-n" junction and line narrowing of output in response to injected current. Each of these may be used with appropriate sensing equipment familiar to one skilled in the art to achieve logical information relationships.

In FIG. 2A, the light intensity parallel to the "p-n" junction of the device abruptly increases beyond a threshold value "A" as the current value reaches that required to support stimulated emission of radiation within the device. With current values beyond the point "A," the light, as shown in FIG. 1, changes from a standard beam to a narrower intense beam.

Referring next to FIG. 2B, a graph is shown illustrating the abrupt line narrowing of the light output emission with injected carrier density. The variation in spectral width of the line, labeled $\Delta E(eV)$ with current is shown in the graph of FIG. 2B and an abrupt line narrowing occurs beyond a threshold current value A.

In accordance with the invention, increments of current are injected in any one of the N possible contacts provided as shown in FIG. 1. Each of these contacts provides an increment of current and the sum of the currents provides a total current sufficient to pass the threshold point A of the curves and initiate stimulated emission of radiation. When the current threshold region A has been traversed, the light from the device as shown schematically as a broad band in FIG. 1 representing a logical 0 abruptly narrows to an intense band only a few Angstroms wide representing a logical 1. Such a signal indication is very large and may be utilized by many standard light processing techniques known in the art.

Each contact 7A–7N of FIG. 1 is dimensionally constructed as described in connection with FIGS. 1A and 1B to activate a common laser active region. This may be realized by making all the contacts as close as possible to but not short out the "p-n" junction. Where there are two or more, for example "N," as illustrated, contacts which activate the same laser active region then the total current "I" for exhibiting the phenomenon of stimulated emission of radiation in terms of the injected currents of the individual contacts will be approximately $I_{7A}+I_{7B}+I_{7C} \ldots +I_{7N}$. When the criteria of the invention are satisfied, the optical output of the injection laser from the region 6 will be responsive to a function of I rather than the sum of "N" functions of $I_{7A}, I_{7B}, I_{7C} \ldots I_{7N}$ separately.

When the impedance requirements as illustrated in FIGS. 1A and 1B are satisfied, the resistance between individual connections 7A–7N will be sufficiently high that the current $I_{7A}$–$I_{7N}$ may be separately controlled by an external circuit or circuits; and hence, the current contribution of each contact 7A–7N will be representative of the value of an independent logical variable.

Referring next to FIG. 3, some of the logical properties of the device of the invention, as illustrated in FIG. 1, may be seen wherein assuming independent logical variables "p," "q," and "r," each represented by current increments, the sum of which, as shown in FIGS. 2A and 2B, exceeds the threshold A, the logical function AND symbolized (⊙) for the three variables "p," "q," and "r" will be achieved as shown in the truth table of FIG. 3.

It will be apparent to one skilled in the art that what is shown here is a way to achieve directly a logical operator of a particular order of magnitude of class of logical operators; for example the AND shown in FIG. 3 is a directly achieved ternary logical operator. The term ternary in this sense refers to information that is binary by signal level and ternary by number of variables. When a logical operator of a higher order of logical variables is achieved directly, a plurality of other logical operators involving lesser numbers of logical variables is included therein so that by the fixed assignment of signals to a particular one of the input terminals various lower order logical operators may be achieved. This is illustrated in FIG. 3 wherein the variable "r" is replaced by a logical fixed function selection signal so that the logical relationship between the variables "p," "q" then describe the logical operator OR, symbolized (V). In order to achieve the AND and OR logical operators described above, when an input variable to one of the contacts 7A–7N is introduced in the form of an increment of current and its absence indicated by no current, and if "I," sufficient for threshold A for stimulated emission, as illustrated in FIGS. 2A and 2B, is equal to three increments then the individual increments may have a value less than the required threshold current over two but greater than the required threshold current over three.

As another illustration of the logical properties of the invention a majority function of three variables can be achieved by assigning the currents representing individual variables by a current of a value less than the required threshold but greater than the required threshold over two. Under these conditions the output would describe the logical function shown in the column of FIG. 3 labelled Majority which is a representation of the majority logical function well-known in the art.

Various logical properties of devices have been set forth in U.S. Patent No. 3,028,088 to B. Dunham.

A number of structural variations will be apparent to one skilled in the art. While the individual contacts have been illustrated as separate ohmic contacts to an existent "p-n" junction, it will be apparent that they could each serve as a separate "p-n" junction so positioned as to share a common laser active region.

In order to enable one skilled in the art to have a starting place in the practice of the technology of the invention, the following illustrative specifications are set forth.

Monocrystalline gallium arsenide _____ 0.005 x 0.005 x 0.050 inch.
"n" Conductivity type region—tellurium doped __ $10^{16}$ atoms per cc.
"p" Conductivity type region—zinc doped _____ $10^{17}$ atoms per cc.
"p-n" Junction 5 location __ 0.003 inch from surface.
Contacts 7A, 7B, 7C . . . 7N tin alloy _____ 0.001 inch diameter.
Threshold current density _ 300 amperes per square centimeter of area of junction 5.

What has been described is a technique of performing logic whereby the interrelationship of information is performed within an injection laser crystal and the light output is a combinatorial function of the separate inputs.

While the invention has been particularly shown and described with reference to a preferred embodiment thereof, it will be understood by those skilled in the art that various changes in form and details may be made therein without departing from the spirit and scope of the invention.

What is claimed is:

1. Logical information handling apparatus capable of combinatorially relating logical information signals to produce an output signal of light responsive to the combination of said logical information signals comprising:
    a body of material capable of exhibiting stimulated emission of radiation by recombination of carriers therein,
    a plurality of logical variable signal introduction elements each positioned in operable relationship to a common region of stimulated emission of radiation within said body,
    each said logical variable signal introduction element being spatially related to each adjacent said logical variable signal introduction element that a logical signal introduced at a particular logical variable signal introduction element independently influences said common region of stimulated emission of radiation.

2. Energy conversion apparatus capable of combinatorially relating increments of electrical current to produce an output signal of light responsive to the sum of said electrical energy increments comprising:
    a body of material capable of exhibiting stimulated emission of radiation by recombination of carriers therein,
    a plurality of independent electrical current introduction elements, each positioned with respect to a region of stimulated emission of radiation within said body such that the individual impedance for each contact to said stimulated emission region is sufficiently small relative to the impedance between each said contact and an adjacent said contact for independent operation.

3. Energy conversion apparatus capable of combinatorially relating increments of electrical current to produce an output signal of light responsive to the sum of said electrical energy increments comprising:
    a body of material capable of exhibiting stimulated emission of radiation, and
    a plurality of independent electrical current introduction elements, each positioned with respect to a region of stimulated emission of radiation within said body such that the individual impedance for each contact to said stimulated emission region is sufficiently small relative to the impedance between each said contact and an adjacent said contact for independent operation.

4. Energy conversion apparatus capable of combinatorially relating increments of electrical current to produce a light output signal comprising:
 a body of semiconductor material having a "p-n" junction being capable of exhibiting stimulated emission of radiation in response to injected current therein;
 a plurality of independent connections positioned in one extrinsic conductivity type region of said body; and
 having a dimension between each said contact and a stimulated emission of radiation region adjacent said "p-n" junction in said body that is less than the individual intercontact separation distances between said plurality of contacts.

5. A device for converting electrical energy from several sources into a single light beam comprising:
 a body of semiconductor material containing a "p-n" junction and capable of exhibiting stimulated emission of radiation in response to injected electric current in excess of a predetermined magnitude,
 at least first and second electrically independent ohmic connections applied to one extrinsic conductivity type region of said body and,
 having a dimensional relationship such that each said ohmic contact is closer to a laser active region within said body than each contact is to an adjacent said contact.

6. A device for converting electrical energy from several sources into a single light beam comprising:
 a body of semiconductor material containing a "p-n" junction and capable of exhibiting stimulated emission of radiation in response to injected electric current in excess of a predetedmined magnitude,
 at least first and second electrically independent ohmic connections applied to one extrinsic conductivity type region of said body and,
 having a dimensional relationship such that each said ohmic contact is positioned more closely to a laser active region within said body than each contact is positioned to an adjacent said contact.

7. A device for converting the sum of electrical energy from several sources into a single coherent light beam comprising:
 a body of semiconductor material containing a "p-n" junction and capable of exhibiting stimulated emission of radiation in response to injected electric current in excess of a predetermined magnitude,
 at least first and second electrically independent ohmic connections applied to one extrinsic conductivity type region of said body and,
 having a dimensional relationship such that each said ohmic contact is positioned more closely to a laser active region within said body than each contact is positioned to an adjacent said contact;
 means for providing to each said ohmic connection a quantity of current that is greater than the number of said contacts divided into the required said predetermined magnitude current for the device.

8. A device for converting electrical energy from the majority of several sources into a single coherent light beam comprising:
 a body of semiconductor material containing a "p-n" junction and capable of exhibiting stimulated emission of radiation in response to injected electric current in excess of a predeterimned magnitude,
 at least first and second electrically independent ohmic connections applied to one extrinsic conductivity type region of said body and,
 having an impedance relationship such that the impedance between each said ohmic contact to a common laser active region within said body is sufficiently small relative to the impedance between each contact and an adjacent said contact for independent operation; and
 means for providing to each said ohmic connection a quantity of current that is greater than half the required said predetermined magnitude current for the device.

9. A semiconductor device capable of exhibiting stimulated emission of radiation that is responsive to the combination of injected currents from more than one electrode comprising in combination:
 a body of semiconductor material containing a "p-n" junction defining two extrinsic conductivity type regions being capable of exhibiting stimulated emission of radiation,
 a broad area ohmic connection to one extrinsic conductivity type region and,
 at least first and second electrically independent ohmic connections to the opposite conductivity type region,
 said first and second ohmic connections being separated by a crystal distance greater than the distance from each said contact to said "p-n" junction.

10. The device of claim 9 wherein the body is gallium arsenide.

No references cited.

ARTHUR GAUSS, *Primary Examiner.*